May 2, 1967 J. G. MUTHLER 3,317,216
GUN DRILL SEALS
Filed Nov. 6, 1963
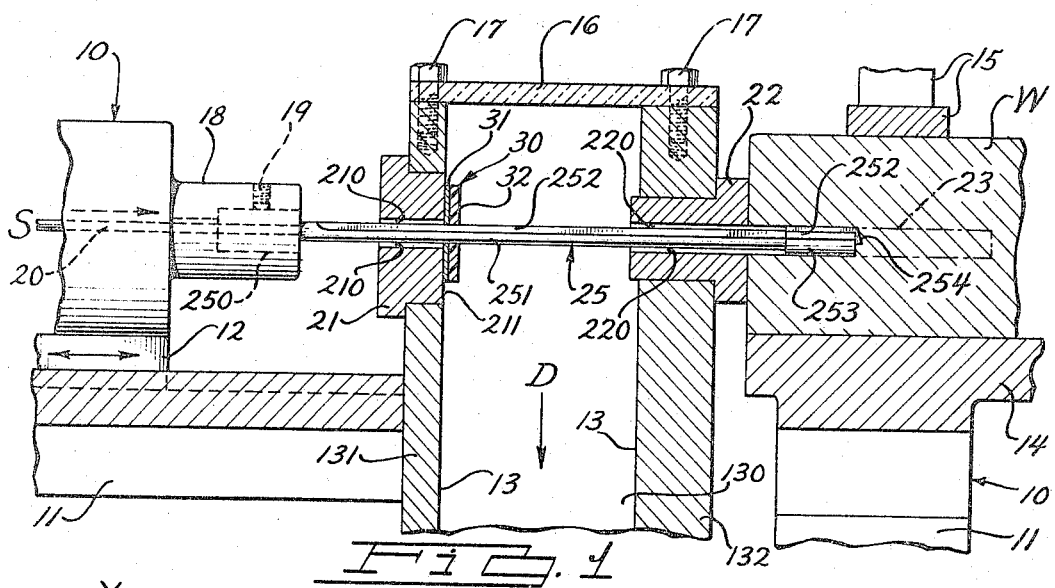
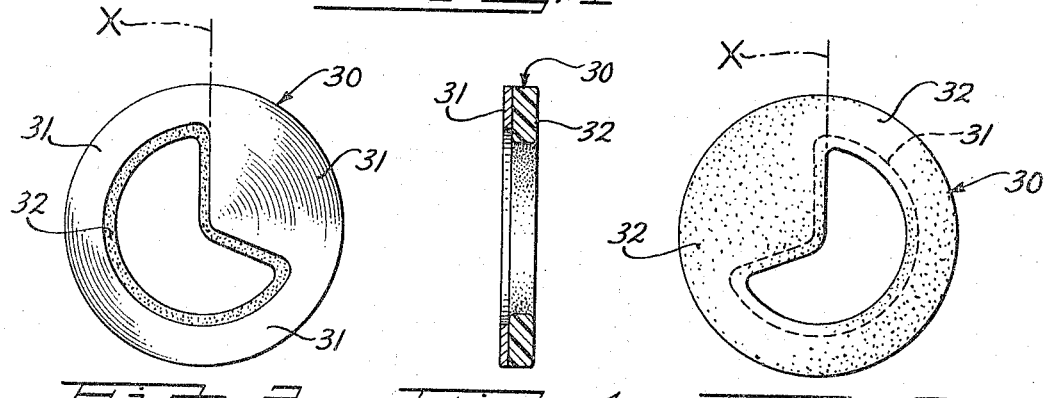
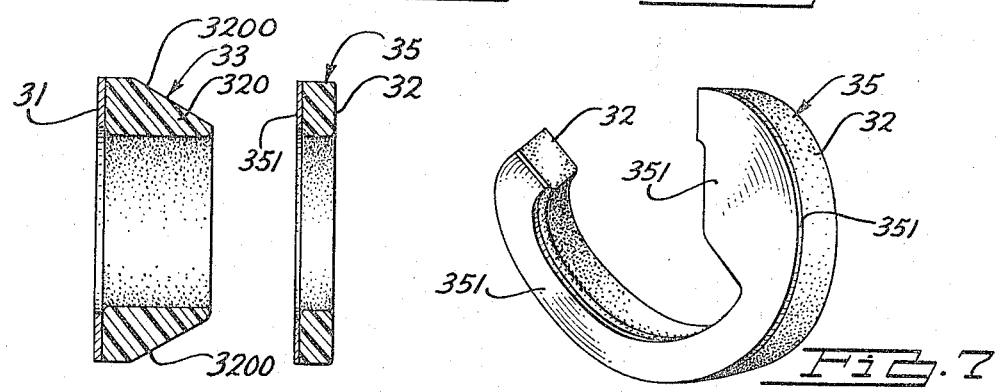
INVENTOR.
JOHN G. MUTHLER
BY
ATTORNEY United States Patent Office 3,317,216
Patented May 2, 1967

3,317,216
GUN DRILL SEALS
John G. Muthler, 35289 Edythe Drive,
Farmington, Mich. 48024
Filed Nov. 6, 1963, Ser. No. 321,896
7 Claims. (Cl. 277—216)

This invention relates to gun drill seals, and in particular to seal means that surround the shank of a gun drill and is intended to be located in the chip box of a gun drill setup to effectively seal the usually bushed passage through which the gun drill enters the chip box, the said gun drill seals being particularly adapted not only to provide an effective friction resistant seal but to resist the extreme wear and shock of continuous bombardment by metal chips carried from the work being drilled into the chip box in coolant discharging thereinto at relatively high velocity under relatively high pressures from the gun drill tip along that portion of the gun drill head and shank residing in the work during drilling thereof.

The primary object of the instant invention is to provide an effective yet inexpensive gun drill seal of the type aforesaid but which is highly resistant to chip bombardment and performs its sealing function over a longer drill time than heretofore, and which may be quickly and readily replaced without the expenditure of usually long machine-down time for seal changing.

Other objects of the invention will become apparent by reference to the following detailed description taken in connection with the accompanying drawings, in which:

FIG. 1 is a fragmentary more or less diagrammatic view of a gun drill setup on a horizontal boring machine or the like.

FIG. 2 is a hard-side side elevational view of a gun drill seal embodying the invention.

FIG. 3 is a soft-side side elevational view of the gun drill seal shown in FIG. 2.

FIG. 4 is a cross sectional view of the gun drill seal shown in FIGS. 1, 2 and 3.

FIG. 5 is a cross sectional view similar to FIG. 4 showing an alternate embodiment of a gun drill seal of the invention employing an annular conically tapered resilient sealing and chip deflecting ring on the soft side thereof.

FIG. 6 is a cross sectional view similar to FIG. 4 showing a further alternate embodiment of a gun drill seal of the invention as shown in FIGS. 2, 3 and 4 except that it employs a spring metal contact ring, and is split preferably as indicated by the dot and dash line X in FIGS. 2 and 3.

FIG. 7 is a view in perspective of the gun drill seal shown in FIG. 6 flexed for placement around the gun drill shank within the chip box of a gun drill setup.

Referring now to the drawings wherein like reference characters refer to like and corresponding parts throughout the seveal views, gun drill seals of the invention are disclosed for use in the chip box normally employed in a typical gun drill setup on a horizontal boring machine or the like 10 shown in FIG. 1 for illustrative purposes.

The said typical gun drill setup generally consists of a boring machine, lathe, or the like 10 including a base 11 onto which is mounted a slide 12, a chip box 13 and a work table 14 onto which work W may be clamped by a suitable clamp 15. Coolant and chips carried by the coolant are discharged from the chip box 13 as indicated by the arrow D through the chute 130 thereof. The chip box 13 is preferably covered by a suitable Plexiglas or other transparent cover 16 removably secured on the top thereof by studs 17. The slide 12 carries a suitable spindle 18 adapted to receive and drive a gun drill 25 by its driver end 250 which is anchored into the machine spindle by such means as a stud 19. Coolant from a high pressure source S is supplied to the gun drill 25 through its driver end 250 by means of a high pressure coolant line 20. Suitable bushings 21 and 22 in the walls 131 and 132 of the chip box 13 accommodate the gun drill 25 in freely rotational relationship therethrough.

The gun drill 25 generally consists of a driver end 250, a hollow shank 251 formed with a longitudinal external V-recess 252 therealong having a drill tip 253 at the end thereof including a continuation of the said V-recess or flute 252 and a cutting edge or element 254. Coolant is supplied to the gun drill 25 under pressure from the source S through the high pressure coolant line 20 and longitudinally through the driver end 250, the hollow shank 251 and the drill tip 253 to the cutting edge or element 254 thereof and is discharged from the bore 23 being drilled in the work W under the same high pressure into the chip box 13 along the V-recess or flute 252 and through the space 220 between the bushing 22 and the hollow shank 251 of the gun drill 25. This high pressure return of coolant carries chips from the drill cut therewith and jets into the chip box 13 striking the gun drill seal 30 of the invention disposed around the gun drill shank 251 and forced by the said coolant jet pressure against the face 211 of the bushing 21 sealing the space 210 between said bushing 21 and the hollow shank 251 of the gun drill 25.

The gun drill seal 30 consists of an annular flat relatively hard thin frictional wear resisting portion 31 which may be of steel, bronze, brass, nylon, Teflon or other wear resistant material and an annular flat relatively soft somewhat thicker resilient shock absorbing portion 32 of tough resilient material such as nylon, Teflon, vinyl plastic, rubber or synthetic rubber capable of absorbing the repeated shock and having the tendency not to distintegrate readily responsive to bombardment by coolant carrying chips discharged under pressure from the space 220 between the bushing 22 and the shank 251 of the gun drill 25.

The said anular frictional wear resisting portion 31 of the gun drill seal is like and similar to a washer except that it is formed at its inner aperture to fit somewhat loosely over and follow the outer cross sectonal shape of a particular gun drill 25 with which it is intended to be used, while the annular resilient shock absorbing portion 32 of the said gun drill seal 30 is formed substantially the same shape as the said wear resisting portion thereof except that it is formed at its inner aperture uniform with and somewhat smaller than the outer format of the shank 251 of the particular gun drill 25.

From the foregoing, it will be apparent that the gun drill seal will turn with and about the center of rotation of the gun drill 25 and that the relatively hard wear resisting portion 31 will frictionally bear against the face 211 of the bushing 21 as the said gun drill 25 rotates during drilling of a bore 23 in the work W. The said gun drill seal 30 is constantly urged in fluid sealing relationship over the space 210 in the bushing 21 around the gun drill shank 251 by bombardment thereof by a portion of the coolant and chips leaving the said bore 23 in the work W through the space 220 around the gun drill shank 251 in the bushing 22. The said coolant and chips follow the gun drill shank 251 to and strike against the annular resilient abrasion resistant shock absorbing portion 32 of the said gun drill seal 30.

The embodiment of the invention 33 disclosed in FIG. 5 is like and similar to the embodiment of the invention disclosed in FIGS. 2, 3 and 4 except that its resilient annular shock absorbing portion 320 is formed much thicker than the shock absorbing portion 32 of the gun drill seal 30, and is formed generally frusto-conical in cross section. This embodiment has some important advantages in that the chips carried by the coolant thereagainst deflect from the sloping surface 3200 of the shock absorbing portion 320 of the said gun drill seal 32.

The embodiment of the invention 35 disclosed in FIGS. 6 and 7 is like and similar to the embodiment of the invention disclosed in FIGS. 2, 3 and 4 except that the flat relatively hard wear resisting portion 351 thereof is extremely thin and formed of spring steel, spring bronze, spring brass or other suitable spring material capable of being severely flexed and returning to its original flatness after flexing. The hard wear resisting portion 351 and the resilient shock absorbing portion 32 of the gun drill seal are cut radially preferably in the location indicated by the dot and dash line X in FIGS. 2 and 3 whereby to permit the said gun drill seal 35 to be flexed and twisted sufficiently as shown in FIG. 7 to be placed onto and removed from the shank 251 of the gun drill 25 after removing the inspection cover 16 from the chip box 13 without withdrawing the end of the said gun drill 25 into or from the said chip box 13.

Although but several embodiments of gun drill seals embodying the invention have been disclosed and described in detail, it is obvious that many changes and alterations may be made in the size, shape, arrangement and detail of the several elements of the invention and in the material employed therein, all without departing from the spirit and scope of the invention as defined by the appended claims.

I claim:
1. A gun drill seal for sealing the space around the fluted shank of a gun drill entering the chip box of a gun drill setup on a machine tool, said chip box having in opposite walls thereof a circular entrance and a circular exit aperture to accommodate the said gun drill in free rotational telescopic relationship therethrough, said chip box receiving coolant under pressure carrying chips thereinto from the cutting tip of said gun drill through the said circular exit aperture therefor, said gun drill seal comprising
   a relatively hard sealing disc element apertured in the cross sectional configuraton of the fluted gun drill shank to telescope freely thereover, said sealing disc element being formed of a material resistant to abrasive wear during turning when urged axially in face contact with the interior of said chip box adjacent said circular gun drill entrance aperture therein,
   a relatively softer sealing disc element adhered to said hard sealing disc element apertured in the cross sectional configuration of the fluted drill shank to telescope in sealed relationship thereover, said soft sealing disc element being formed of a material softer than said hard sealing disc element and highly resistant to abrasion by the bombardment thereof by coolant carrying chips discharged under pressure thereagainst from said gun drill exit aperture in said chip box, and
   the format of the aperture in said hard sealing disc element and said soft sealing disc element being substantially identical in shape except that the aperture in said soft sealing disc is uniformly smaller than the aperture in said hard sealing disc and uniformly follows the contour thereof.

2. A seal for a gun drilling machine having a chip box with opposite entrance and exit apertures freely accommodating the fluted shank of a rotating gun drill extending therethrough,
   said gun drill seal for sealing the space between the rotating gun drill shank and the chip box at said entrance aperture therein comprising
      an abrasive resistant metallic base washer element having a substantially central aperture therethrough conforming to but larger in all directions than the said gun drill shank,
      and a resilient non-metallic sealing element adhered to and covering said base washer element extending inwardly from the periphery of said central aperture in said base washer element and into sealing contact with said gun drill shank when telescoped thereover,
      said sealing element being of a material highly resistant to and capable of deflecting chips carried by coolant jetted into said chip box from the drill exit aperture thereof against said gun drill seal telescoped on said gun drill shank.

3. A gun drill seal as set forth in claim 2 wherein the non-metallic sealing element is frusto-conically tapered axially outwardly from said metallic base washer element.

4. A gun drill seal as set forth in claim 2 wherein the gun drill seal is radially split and the hard metallic base washer is of a spring material capable of returning to a flat attitude after the gun drill seal is manually flexed for placement on a gun drill shank.

5. A seal for gun drilling machine having a chip box with opposite entrance and exit apertures freely accommodating the fluted shank of a rotating gun drill extending therethrough,
   said drill seal for sealing the space between the rotating gun drill shank and the chip box at said entrance aperture therein comprising
      an abrasive resistant hard base washer element having a substantially central aperture therethrough conforming to but larger in all directions than the said gun drill shank,
      and a resilient relatively soft sealing element adhered to and covering said base washer element extending inwardly from the periphery of said central aperture in said base washer element and into sealing contact with said gun drill shank when telescoped thereover,
      said sealing element being of a material highly resistant to and capable of deflecting chips carried by coolant jetted into said chip box from the drill exit aperture thereof against said gun drill seal telescoped on said gun drill shank.

6. A gun drill seal as set forth in claim 5 wherein the relatively soft sealing element is frusto-conically tapered axially outwardly from said base washer element.

7. A seal for a gun drilling machine having a chip box with opposite entrance and exit apertures freely accommodating the fluted shank of a rotating gun drill extending therethrough,
   said gun drill seal for sealing the space between the rotating gun drill shank and the chip box at said entrance aperture therein when telescoped over said gun drill shank comprising,
      an abrasive resistant hard base washer element having a substantially central aperture therethrough conforming to but slightly larger in all directions than the said gun drill shank,
      and a resilient relatively soft sealing element adhered to and covering said base washer element substantially conforming in configuration to said central aperture in said base washer element,
      said sealing element being of a material highly resistant to and capable of deflecting chips carried by coolant jetted into said chip box from the drill exit aperture thereof against said gun drill seal when telescoped on said gun drill shank.

References Cited by the Examiner

UNITED STATES PATENTS

| | | | |
|---|---|---|---|
| 524,162 | 8/1894 | Cochrane | 277—233 |
| 1,521,483 | 12/1924 | Stevens | 277—234 |
| 2,553,750 | 5/1951 | Cole | 277—12 |
| 2,951,721 | 9/1960 | Asp | 277—227 |

FOREIGN PATENTS

| | | |
|---|---|---|
| 4,188 | 3/1894 | Great Britain. |

LAVERNE D. GEIGER, *Primary Examiner.*

E. V. BENHAM, *Examiner.*

J. S. MEDNICK, *Assistant Examiner.*